J. D. CASEY.
WHEEL.
APPLICATION FILED FEB. 20, 1912.

1,043,506.

Patented Nov. 5, 1912.

Witnesses.
Thomas Byrnes
J K R Diffenderffer

Inventor:
James D. Casey
By Chapin & Ferguson
Attorney.

UNITED STATES PATENT OFFICE.

JAMES D. CASEY, OF BALTIMORE, MARYLAND.

WHEEL.

1,043,506.

Specification of Letters Patent.    Patented Nov. 5, 1912.

Application filed February 20, 1912. Serial No. 678,812.

*To all whom it may concern:*

Be it known that I, JAMES D. CASEY, a citizen of the United States, residing at Baltimore, in the State of Maryland, have invented certain new and useful Improvements in Wheels, of which the following is a specification.

This invention relates to improvements in wheels, and has for its object to provide a device especially adapted for use on automobiles and motor vehicles whereby the pneumatic tires generally in use on such vehicles may be dispensed with, at the same time retaining the cushioned effect produced by said pneumatic tires.

The invention consists of the novel construction and arrangement of the parts and combination of parts hereinafter more fully set forth in the following specification and pointed out in detail in the claims.

Figure 1:
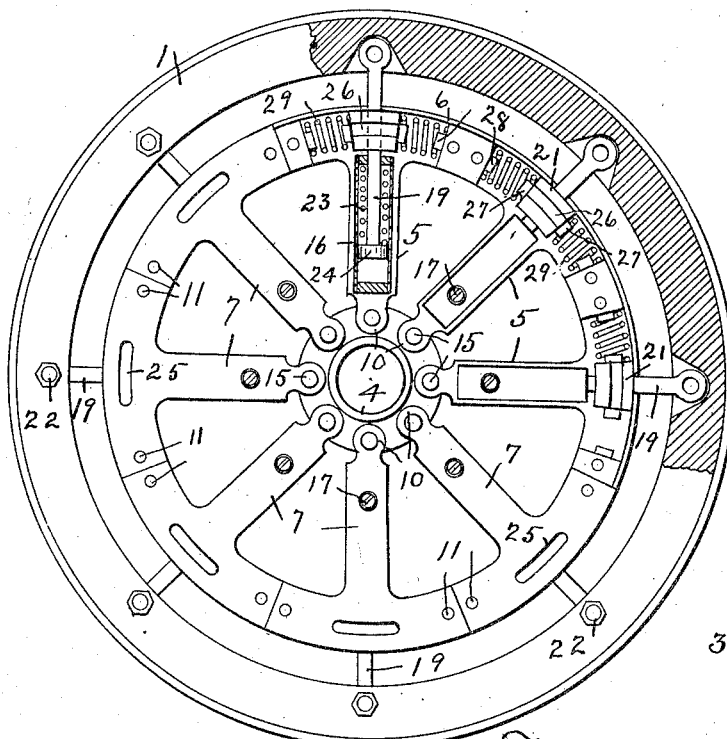
Figure 2:
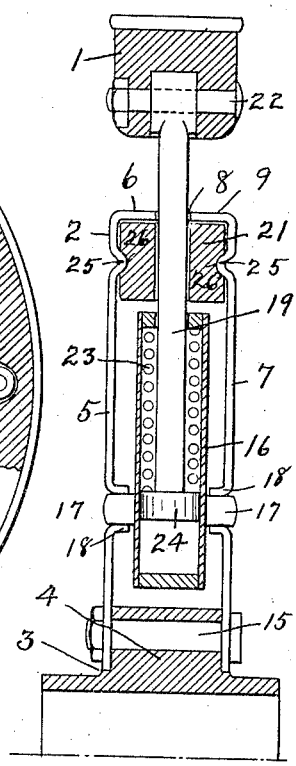
Figure 3:
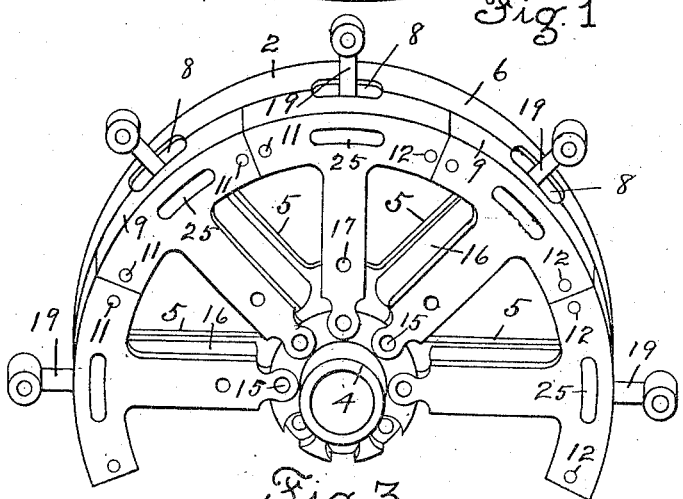
Figure 4:
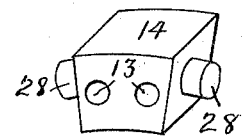
Figure 5:
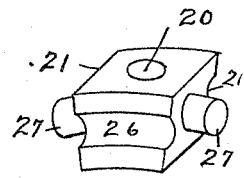

In the accompanying drawings,—Figure 1 is a side elevation of my invention, partly in section. Fig. 2 is a vertical sectional view, on an enlarged scale, through one of the spokes and the hub. Fig. 3 is a perspective view of the inner wheel, partly broken away. Fig. 4 is a perspective view of one of the stationary blocks. Fig. 5 is a perspective view of one of the slidable blocks.

Referring to the accompanying drawings, forming part of this specification, and in which like reference numerals designate like parts throughout the several views thereof, 1 designates the outer wheel within which is flexibly connected the inner wheel. This inner wheel is composed of two faces, the face 2 of which has a central aperture 3 which fits over the hub 4, and a number of integral spokes 5. The outer edge 6 of the face 2 is bent in at right angles and provided with a number of cut-outs which are adjacent the cut-outs of the removable spokes 7, thus forming the elongated slots 8. The other face of the inner wheel is composed of a number of removable spokes 7 having their outer ends 9 bent at right angles and provided with cut-outs forming part of the slots 8, and their inner ends provided with the heads 10 which fit into similar shaped recesses in the face of the hub 4. The removable spokes 7 are held in position at their upper ends by the bolts 11 which pass through the apertures 12 in said spokes, through the apertures 13 in the stationary blocks 14 and through the face 2, and at their lower ends by the bolts 15. Between each of the removable spokes 7 and the integral spokes 5 of the face 2, is a cylinder 16 having a trunnion 17 on each side mounted in a bearing 18 in each of said spokes formed by pressing the metal inwardly. These cylinders 16 are each provided with a rod 19 projecting through the outer end of said cylinder and through the aperture 20 of the slidable block 21 and have their outer ends connected by the bolts 22 to the outer wheel 1. Within each cylinder 16 is a coiled spring 23 surrounding the said rod 19 between the head 24 and the upper end of said cylinder, which serves to keep the inner and outer wheels in their relative position, and also to allow the said wheels to yield with respect to each other, thus producing the cushioned effect of the pneumatic tire. The slidable blocks 21 are held and slide on the shoulders 25 formed by indenting the metal of the spokes 7 and the face 2, the same fitting into the recesses 26 on the opposite sides of the said slidable blocks 21. These slidable blocks 21 are each provided with lugs 27 on each end thereof, and the stationary blocks 14 are also provided with lugs 28 on their opposite ends. Between the stationary blocks 14 and the slidable blocks 21 are coiled springs 29, the ends of which latter fit over the lugs 27 and 28 of said blocks. These springs 29 permit of the sidewise movement of the blocks 21 and the rods 19, the latter moving in the elongated slots 8.

It will be seen that should anything happen to one of the cylinders, or the springs connected therewith, the same can be removed and repaired, by simply removing the adjacent removable spoke 7, and disconnecting the outer end of the rod 19 from the outer wheel 1. Thus repairs to any of the said cylinders or its operative parts may be made without disconnecting the inner and outer wheels.

The weight on the wheel will cause the coiled springs 23 to compress in the cylinders as the wheel turns, and the coiled springs 29 permit the rods 19 to move in the elongated slots 8. By the use of these coiled springs 23 in the cylinders 16 and the coiled springs 29, solid tires may be used on the wheels with the same cushioned effect as that produced by the use of the pneumatic tires on the wheels in general use.

Having thus described my invention, what I claim is:

1. The combination of an outer wheel, a hub having one flat side and the other side being provided with a number of recesses, an inner wheel having two faces one of which has integral spokes and is secured to the flat side of the hub and the other face comprising a plurality of independently removable spokes having heads on their inner ends adapted to fit the recesses in the side of the hub and their outer ends secured to the other face of the wheel, and flexible connections between said inner and outer wheels.

2. The combination of an outer wheel, an inner wheel having a plurality of elongated slots in the outer rim thereof, a plurality of removable spokes, a plurality of stationary blocks at the upper edge of said inner wheel, a plurality of slidable blocks, springs between said stationary blocks and removable blocks, a cylinder mounted between the said spokes of the inner wheel, a rod projecting from each cylinder extending through the removable blocks and having its outer end connected to the outer wheel, and a coiled spring in each cylinder surrounding the said rod.

3. The combination of an outer wheel, a hub having one flat side and the other side being provided with a number of recesses, an inner wheel having two faces one of which has integral spokes and is secured to the flat side of the hub and the other face comprising a plurality of independently removable spokes having heads on their inner ends adapted to fit the recesses in the side of the hub and their outer ends secured to the other face of the wheel, cylinders mounted between the spokes of the inner wheel, a rod projecting from each cylinder and having its outer end connected to the outer wheel, and springs in each of said cylinders.

4. The combination of an outer wheel, a hub having one flat side and the other side being provided with a number of recesses, an inner wheel having a plurality of elongated slots in the outer rim thereof and composed of two faces one of which has integral spokes and is secured to the flat side of the hub and the other face comprising a plurality of independently removable spokes having heads on their inner ends adapted to fit the recesses in the side of the hub and their outer ends secured to the other face of the wheel, cylinders mounted between the spokes of the inner wheel, a rod projecting from each cylinder and having its outer end projecting through the said elongated slots and connected to the outer wheel, and springs in each of said cylinders.

5. The combination of an outer wheel, a hub having one flat side and the other side being provided with a number of recesses, an inner wheel having two faces one of which has integral spokes and its outer end bent at right angles and provided with a number of cut-outs in the edge thereof, and the other face comprising a plurality of independently removable spokes each having its outer end bent at right angles and provided with a number of elongated cut-outs coincident with the cut-outs in the other face, the inner ends of said spokes being provided with heads adapted to fit the recesses in the hub, cylinders mounted between said spokes of the inner wheel, rods projecting from said cylinders and having their outer ends projecting through the said elongated slots and connected to the outer wheel, and springs in said cylinders.

In testimony whereof I affix my signature in presence of two witnesses.

JAMES D. CASEY.

Witnesses:
CHAPIN A. FERGUSON.
ROBERT C. RHODES.